US009132793B2

(12) United States Patent
Nickel et al.

(10) Patent No.: US 9,132,793 B2
(45) Date of Patent: Sep. 15, 2015

(54) FRONT END FOR A MOTOR VEHICLE

(71) Applicant: GM GLOBAL TECHNOLOGY OPERATIONS LLC, Detroit, MI (US)

(72) Inventors: Marco Nickel, Riedstadt (DE); Matthias Erzgraeber, Darmstadt (DE); Theobald Hock, Grossostheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/174,177

(22) Filed: Feb. 6, 2014

(65) Prior Publication Data
US 2014/0217758 A1 Aug. 7, 2014

(30) Foreign Application Priority Data

Feb. 6, 2013 (DE) .......................... 10 2013 002 307

(51) Int. Cl.
*B60R 19/12* (2006.01)
*B60R 21/34* (2011.01)
*B60R 19/18* (2006.01)

(52) U.S. Cl.
CPC ................ *B60R 19/18* (2013.01); *B60R 19/12* (2013.01); *B60R 21/34* (2013.01); *B60R 2019/1873* (2013.01)

(58) Field of Classification Search
CPC .............. B60R 21/34; B60R 2021/343; B60R 2021/346; B60R 19/12; B60R 19/18; B60R 2019/1886
USPC ........ 296/187.04, 187.09; 293/120–122, 132, 293/133, 135, 136
See application file for complete search history.

(56) References Cited

U.S. PATENT DOCUMENTS

| | | | | |
|---|---|---|---|---|
| 6,540,275 B1* | 4/2003 | Iwamoto et al. | ................ | 293/24 |
| 6,755,459 B2* | 6/2004 | Thelen et al. | ............ | 296/187.04 |
| 6,893,064 B2* | 5/2005 | Satou | ............. | 293/132 |
| 7,410,018 B2* | 8/2008 | Satou | ............ | 180/68.4 |
| 7,441,828 B2* | 10/2008 | Noyori et al. | ............ | 296/187.04 |
| 7,481,484 B2* | 1/2009 | Hirano | ..................... | 296/187.04 |
| 7,517,006 B2* | 4/2009 | Kageyama et al. | ...... | 296/187.09 |
| 7,575,271 B2* | 8/2009 | Hasegawa et al. | ....... | 296/187.04 |
| 7,597,383 B2* | 10/2009 | Itou et al. | ................. | 296/187.04 |
| 7,607,720 B2* | 10/2009 | Noyori et al. | ............ | 296/187.04 |
| 7,887,121 B2* | 2/2011 | Hasegawa et al. | ....... | 296/187.04 |
| 8,042,847 B2* | 10/2011 | Garg et al. | .................... | 293/102 |
| 8,132,851 B2* | 3/2012 | Steller et al. | ............ | 296/187.04 |
| 8,403,403 B2* | 3/2013 | Tashiro et al. | ............ | 296/187.09 |
| 8,449,021 B2* | 5/2013 | Mana et al. | ............ | 296/187.04 |
| 8,714,294 B2* | 5/2014 | Hasegawa et al. | ............ | 180/274 |
| 2007/0046043 A1* | 3/2007 | Ito | ................. | 293/120 |

(Continued)

FOREIGN PATENT DOCUMENTS

| | | | |
|---|---|---|---|
| DE | 60017697 T2 | 12/2005 | |
| DE | 60107570 T2 | 12/2005 | |

(Continued)

*Primary Examiner* — Gregory Blankenship
(74) *Attorney, Agent, or Firm* — Ingrassia Fisher & Lorenz PC

(57) ABSTRACT

A front end for a motor vehicle is disclosed which includes a bumper covering and a support extending in the longitudinal direction of the vehicle between the bumper covering and a supporting body component. The support has a buckling load which is less than the loading capacity of a connection of the support with the supporting body component and is able to elastically buckle in a collision.

18 Claims, 2 Drawing Sheets

(56) References Cited

U.S. PATENT DOCUMENTS

2007/0046044 A1* 3/2007 Tanabe .......................... 293/120
2007/0085356 A1 4/2007 Itou et al.
2008/0093868 A1* 4/2008 Steller .......................... 293/142
2008/0169661 A1* 7/2008 Hirano .......................... 293/15
2009/0200811 A1* 8/2009 Erzgraber et al. ............ 293/120
2013/0015011 A1* 1/2013 Hasegawa et al. ........... 180/274
2013/0175812 A1* 7/2013 Ota et al. ...................... 293/102
2014/0028051 A1* 1/2014 Oota ........................ 296/187.04

FOREIGN PATENT DOCUMENTS

| DE | 102005059447 A1 | 6/2007 |
| DE | 102009017350 A1 | 10/2010 |
| DE | 102010056390 A1 | 6/2012 |

\* cited by examiner

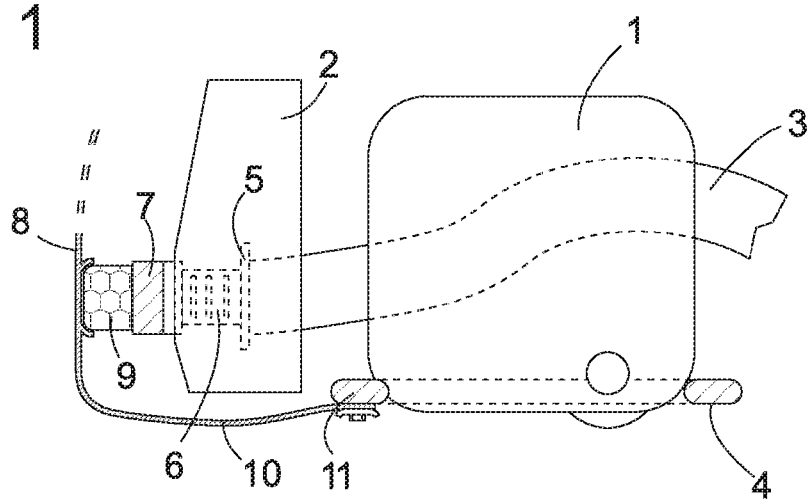
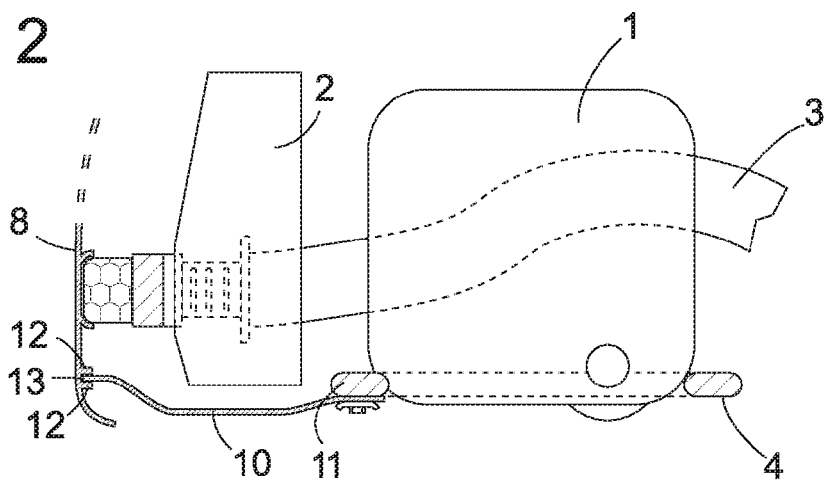
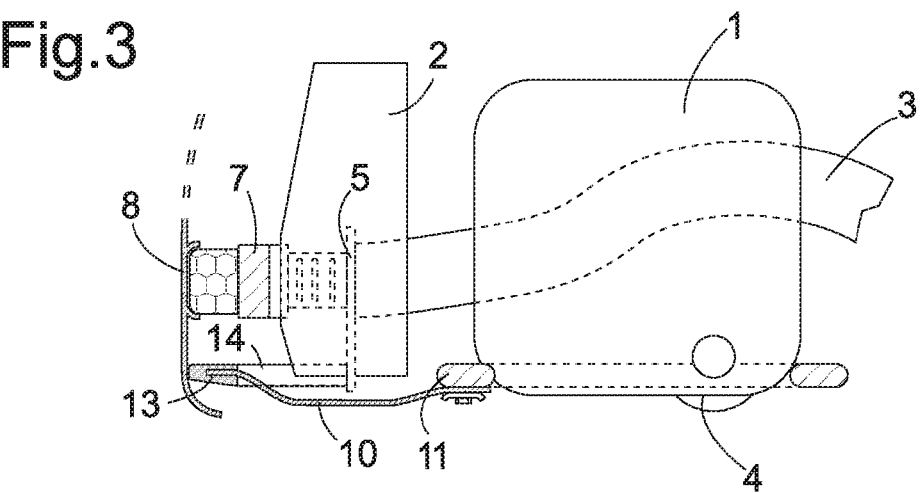

FRONT END FOR A MOTOR VEHICLE

CROSS REFERENCE TO RELATED APPLICATION

This application claims priority to German Patent Application No. 10 2013 002 307.6, filed Feb. 6, 2013, which is incorporated herein by reference in its entirety.

TECHNICAL FIELD

The present disclosure relates to a front end for a motor vehicle, which is optimized with regard to protection of pedestrians in collisions.

BACKGROUND

From DE 10 2009 017 350 B4 a motor vehicle front end is known, with a bumper covering and an underbody surface element which extends between the bumper covering and a supporting body component. In order to protect the supporting body component from deformation in a collision with a fixed obstacle such as a wall, the underbody surface element must consume as much collision energy as possible whilst it is being deformed. For this, the underbody surface element is fastened to the supporting body component via predetermined breaking connections, which break off in the wall impact.

In a collision with a pedestrian, the bumper covering and the underbody surface element are exposed to substantially lesser stresses than in a wall impact, and in addition these stresses act only on a small portion of the front end. Therefore, the predetermined breaking connections remain intact. Even if the collision is relatively hard generally only small deformations of the vehicle front end result. DE 10 2009 017 350 B4 refers to research, according to which the risk of injury to a pedestrian is to be less in such a hard impact than in a soft one.

At least one object of the disclosure is to create a front end for a motor vehicle which reduces the risk of injury to a pedestrian from a vehicle-pedestrian collision.

SUMMARY

A front end for a motor vehicle is provided with a bumper covering and a support extending in the longitudinal direction of the vehicle between the bumper covering and a supporting body component. The support is configured to elastically buckle under an external load.

When a structure deforms under an external load, generally the restoring force increases with the deformation. In a buckling process, however the restoring force only increases up to a maximum, in order to thereafter decrease again. If the external load is independent of the deformation, for instance a beam bending under a weight which is resting on it, then exceeding the maximum mostly leads to collapse. As the structure is all the more incapable of withstanding the load beyond the maximum, it yields until its shape is completely changed, and in so doing generally exceeds its elastic limit. Even after discontinuation of the load, the structure cannot then return into its original shape.

In the case of a collision, on the other hand, the load decreases with increasing deformation and ceases to exist entirely as soon as the speeds of the colliding objects are matched to one another. Therefore, in the case of a collision, the deformation of the support can come to a standstill completely beyond the maximum of its restoring force and the support can return from there elastically into its original shape. On both sides of the maximum, however, a region exists in which the restoring force only alters slightly with the deformation. In the case of a vehicle-pedestrian collision and this region can be utilized in order to accelerate the legs of a pedestrian on a long distance continuously and gently.

Elastic buckling of the support rules out the hard collision between motor vehicle front end and pedestrian which is conventionally regarded as necessary, and therefore on superficial consideration one may expect a higher risk of injury. The fact that a reduction to the risk is able to be achieved through the elastic buckling reveals itself only on closer consideration of the sequence of a vehicle-pedestrian collision. In a first phase, the front end of the vehicle catches the legs of the pedestrian and accelerates these in the direction of travel. In this phase, the torso of the pedestrian does not yet have contact with the vehicle and is initially merely pivoted over the entrained legs. So as not to break, the legs must follow the pivoting movement. When a moving heavy rigid body strikes onto a resting light one, the result from the laws of conservation of momentum and energy is that the heavy body is decelerated slightly, whilst the lighter one which is struck against moves away at high speed. If this model were able to be applied to the case of the vehicle-pedestrian collision, it would mean that the legs, which are light compared with the vehicle, lose contact with the vehicle front end after they have been struck against, and thereupon are able to be set in rotation with a small moment of inertia. If, on the other hand, the vehicle front yields inelastically, the legs are not pushed away, but rather remain in contact with the vehicle front and cannot pivot freely. The bending moments occurring here between the legs and the torso can lead to injuries.

However, it is not the hardness of the collision, but rather the degree of the elasticity which is crucial for the question as to whether the legs are thrown so intensively forward in the collision that they can pivot with the torso. If the impact is sufficiently elastic, then the legs are thrown away from the vehicle so intensively that they can pivot. The "hardness" of the collision substantially influences the accelerations to which the legs of the pedestrian are exposed. In order to keep these accelerations and the risk of injury related thereto low, it is definitely helpful to make the front end resilient.

The buckling load of the support should be lower than the loading capacity of a connection with the bumper covering and the supporting body component. In this way, the connection is not damaged on buckling, and the support is supported on the supporting body component so that when it extends out again after a collision the legs are pushed forward.

The deformation resistance of the support must not be too small, so that the legs of the pedestrian do not already penetrate onto rigid parts of the vehicle body at low collision speeds. In order to achieve a high deformation resistance with a low weight of the support, the support should be fixed in a torque-proof manner on the part of the bumper covering or of the supporting body component, and preferably on both sides, in accordance with the third or preferably the fourth case of the known Euler's buckling beam. The direction into which the support yields on buckling is preferably in the vertical direction. A vertically yielding support can be constructed so as to be plate-shaped and can thus support the bumper covering uniformly over the entire width of the front end. The flexural rigidity of such a plate can be increased by ribs extending in the longitudinal direction of the vehicle.

In order to guarantee a reproducible deformation behavior, such a plate-shaped support is preferably pre-curved in longitudinal section in the unstressed state. An upwardly oriented concavity of the support guarantees that the latter, when it is stressed in a collision, buckles downwards. This is expedient particularly when the support extends beneath an engine compartment or respectively at least a front part of the engine compartment of a vehicle, and a free space is present between it and the roadway, into which space it can yield in an unimpeded manner.

The support should extend in the direction of travel at least far enough beneath the vehicle in order to cross below a radiator which is usually accommodated in the engine compartment. In particular, such a radiator can encroach in a space-saving manner into the upwardly oriented concavity of the support. In order to delimit the required space of the support, the height of its ribs beneath the radiator is preferably less than in other regions.

The support can be produced expediently from a plastic which is reinforced with fibers. For the desired elasticity of the support, the fibers are particularly effective if they are aligned at least predominantly in the longitudinal direction of the vehicle. Alternatively, a support made of metal also comes into consideration. The latter can also realize the function of an underride protection, in particular on an off-road vehicle or Sport Utility Vehicle.

Above the elastic support, the bumper covering can be backed with a buffer which is deformable plastically under load. By the support beginning to already extend again elastically after a buckling in contact with the legs of the pedestrian, whilst the buffer in contact with the legs is still buckled, both can cooperate in order to exert in a gentle manner a torque promoting the above-mentioned pivoting movement of the legs.

Preferably, an auxiliary frame supporting an engine comes into consideration as supporting body component.

BRIEF DESCRIPTION OF THE DRAWINGS

The present disclosure will hereinafter be described in conjunction with the following drawing figures, wherein like numerals denote like elements, and:

FIG. 1 is a diagrammatic longitudinal section through a front end of a motor vehicle according to an embodiment;

FIG. 2 is a longitudinal section, analogous to FIG. 1, according to another embodiment;

FIG. 3 is a longitudinal section, analogous to FIGS. 1 and 2, according to yet another embodiment;

DETAILED DESCRIPTION

Figure 4:
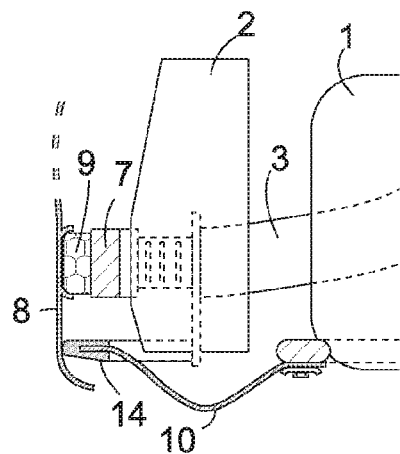
FIG. 4 shows the front end of FIG. 3 in the elastically deformed state.

The following detailed description is merely exemplary in nature and is not intended to limit the present disclosure or the application and uses of the present disclosure. Furthermore, there is no intention to be bound by any theory presented in the preceding background or the following detailed description.

FIG. 1 shows a front end of a motor vehicle in a diagrammatic longitudinal section. An engine 1 and a radiator 2 are situated in a conventional manner in the engine compartment of the vehicle. The engine compartment is flanked on both sides by longitudinal beams 3 which are connected with one another to a rigid frame. An auxiliary frame 4, supporting the engine 1, is also fastened onto this frame in a damped movable manner.

The longitudinal beams 3 are provided at their front ends with flanges 5, on which an upper bumper crossmember 7 is fastened via crash boxes 6. An intermediate space between the front side of the bumper crossmember 7 and a bumper covering 8 is filled by a buffer body 9 of foam material. A plate-shaped support 10 extends the bumper covering 8 in one piece under a front region of the engine compartment including the radiator 2 up to a front crossmember 11 of the auxiliary frame 4, on which a rear edge of the support 10 is clamped in a torque-proof manner by screwing.

The support 10 is formed from an elastic plastic or rubber. To increase its buckling load, it can have an insert of fiber material, in particular of carbon- or aramid fibers. The insert can include one or more layers of nonwoven material. At least one of the layers the fibers may be aligned in the section plane of the longitudinal section. The insert can also include a woven material. A group of threads of the woven material, warp- or weft threads may be aligned in the section plane. Alternatively, metallic materials can be used, in order to combine the function of pedestrian protection with the function of an underride protection.

In the embodiment of FIG. 2, bumper covering 8 and support 10 are realized in two parts. On an inner side of the bumper covering 8 beneath the bumper cross member 7, two ribs 12 adjoin a groove 13, in which a front edge of the support 10 is held in a torque-proof manner by clamping, bonding or the like.

In the embodiment of FIG. 3, a lower bumper cross member 14 is fastened on the flanges 5 beneath the upper bumper cross member 7. In a central region extending in front of the radiator 2, the bumper cross member 14 is supported by the support 10 against a collision force acting from the front. Viewed from above, the bumper cross member 14 is approximately U-shaped with ends fastened to the flanges and with a forwardly oriented arc. The front edge of the support 10 is illustrated here engaging into a groove 13 on the rear side of the arc of the bumper cross member 14. Alternatively, the front edge of the support 10 can be screwed on the bumper cross member 14, as shown for the rear edge on the cross member 11, or it could be clamped between the bumper cross member 14 and other parts of the vehicle front such as for instance a radiator grill extending between the bumper cross members 14, 7.

Representative also for the embodiments of FIGS. 1 and 2, FIG. 4 shows the front end of FIG. 3 in a deformed state during the collision with a pedestrian. The buffer body 9 is buckled, and the bumper cross member 14 is pushed back, so that the distance between it and the auxiliary frame 4 is reduced and the support 10 is forced to flex downwards, following its curvature which is already present in the relaxed state of FIG. 3. Whilst the buckling of the buffer body 9 is not yet fully completed, the support 10 has reached here the maximum of its elastic deformation and begins to extend forward again. Whilst the thigh and knee of the pedestrian can therefore press still further into the bumper covering 8, the lower leg is already pushed away again, and a pivoting movement of the pedestrian's legs is provoked, which distinctly reduces the load of knees and leg bones of the pedestrian on striking onto the engine hood.

Figure 5:
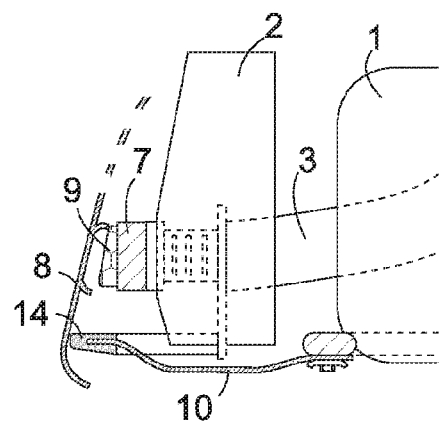
FIG. 5 shows the front end of FIG. 3 after an elastic deformation.

FIG. 5 shows the front end with the bumper cross member 14 already moved forward again into the initial position. The buffer body 9 is deformed plastically and is not yet expanded again. The buffer body 9 may include rigid foam which does in fact behave elastically in the case of small deformations, but is deformed irreversibly by the loads occurring in the case of a pedestrian collision. However a foam material of higher elasticity is preferred, for instance an EPP foam, which can return into its original shape again even after intensive deformations, such as can occur in the case of a pedestrian collision, but which does this slowly, so that it does not exhibit any appreciable restoring behavior at least during the collision, in contrast to the support 10. The bumper covering 8 is pivoted slightly as a whole, which, however, has no influence on the orientation of the front edge of the support 10 which is held in a torque-proof manner on the crossmember 14.

It can be easily envisaged that a deformation, as shown in FIG. 5, would also lead to a slight rotation of the front edge of the support 10 in the embodiments of FIGS. 1 and 2. This means that whilst the support 10 in the embodiment of FIG. 3 is mounted in a torque-proof manner at both ends in accordance with the fourth case of Euler's buckling beam and therefore with given material thickness a maximum of buckling load is reached, the first and second embodiment respectively present an intermediate solution between the third and the fourth case of Euler's buckling beam and therefore do not reach such a high buckling load.

Figure 6:
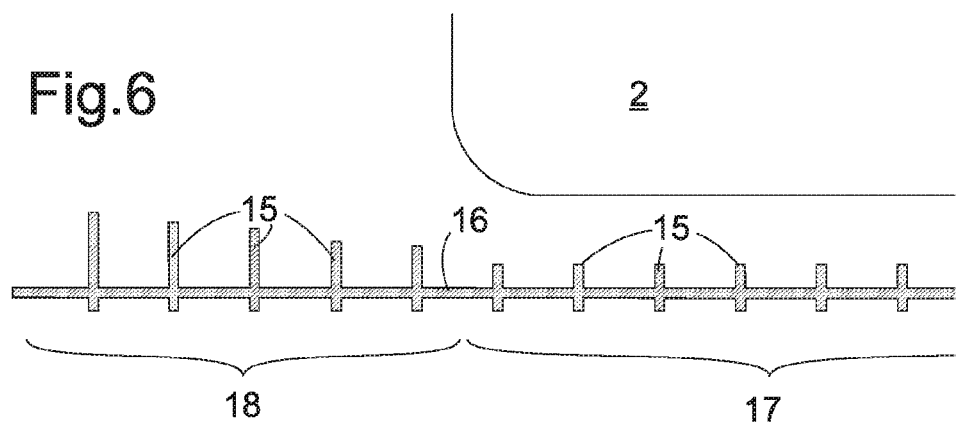
FIG. 6 is a diagrammatic cross-section of the support.

The buckling load of the plate 10 can be optimized by suitable selection of material and cross-sectional structure. A contribution is made to a high buckling load in particular if the support 10 is provided with ribs 15 extending in the effective direction of the buckling load, as shown in FIG. 6. The ribs 15 can be arranged on one or, as shown, on two sides of a base plate 16 of the support 10.

Figure 7:
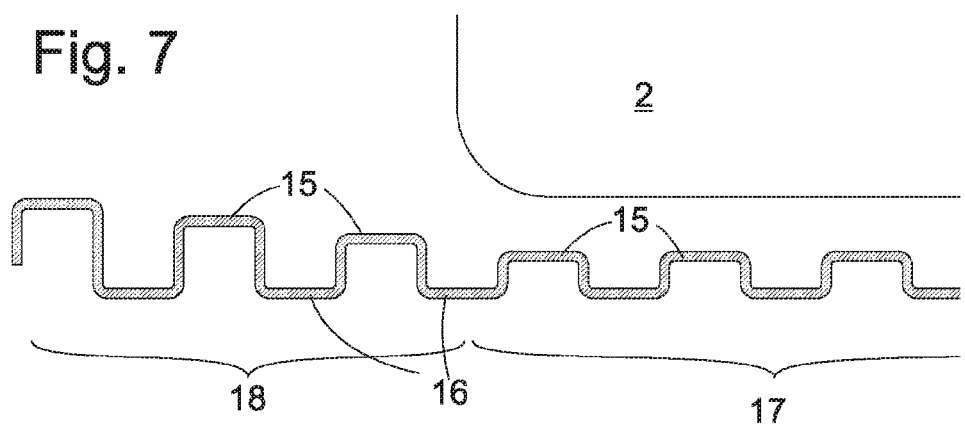
FIG. 7 is an alternative diagrammatic cross-section of the support.

Whilst in a central region 17 of the support 10 the height of the ribs 15 can be delimited by the proximity to the radiator 2, more space is available in a lateral region 18, to the right and left of the radiator 2, so that the ribs 15 can be distinctly higher here. A greater rigidity of the support 10, resulting therefrom, in the lateral region 18 is definitely desired, in order to achieve a deformation behavior which is uniform over the width of the vehicle front, because the deformation resulting from a central collision can be distributed in the support 10 towards two sides, but in the case of a lateral collision only over one side, and the energy received in the deformation of the support 10 in both cases is to be substantially the same. A support 10 with hollow ribs 15, as shown in FIG. 7, is also effective.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A front end for a motor vehicle comprising:
    an engine compartment that is configured to house an engine;
    a supporting body component for supporting the engine;
    a bumper covering; and
    a support extending in a longitudinal direction of the motor vehicle between the bumper covering and the supporting body component, wherein the support has an original shape and is able to be buckled elastically during a collision such that the support is able to return to the original shape after deformation, wherein the support comprises:
        a first lateral region that has a front edge coupled with the bumper covering;
        a second lateral region that has a rear edge that is secured to the supporting body component; and
        a central region located between the first lateral region and the second lateral region, wherein the central region is below the first lateral region and the second lateral region when the support is in an unstressed state to ensure that the central region buckles in a downward direction when stressed.

2. The front end according to claim 1, wherein a buckling load of the support is less than a loading capacity of a connection of the support with the supporting body component.

3. The front end according to claim 1, wherein the support is fixed to a portion of the bumper covering in a manner which prevents relative rotational movement therebetween.

4. The front end according to claim 1, wherein the support is fixed to a portion of the supporting body component in a manner which prevents relative rotational movement therebetween.

5. The front end according to claim 1, wherein the support is fixed to a portion of the bumper covering and to a portion of the supporting body component in a manner which prevents relative rotational movement therebetween.

6. The front end according to claim 1, wherein the deflection direction of the support is the vertical.

7. The front end according to claim 1, wherein the support is plate-shaped.

8. The front end according to claim 7, wherein the support has ribs extending in the longitudinal direction of the vehicle.

9. The front end according to claim 8, wherein the support is curved in longitudinal section with an upwardly oriented concavity.

10. The front end according to claim 1, wherein the support crosses below at least a front part of an engine compartment.

11. The front end according to claim 10, wherein the front part which is crossed below contains a radiator.

12. The front end according to claim 11, wherein the deflection direction of the support is the vertical, and wherein the height of the ribs in a region beneath the radiator is less than in other regions of the support.

13. The front end according to claim 1, wherein the support is produced from metal.

14. The front end according to claim 1, wherein the bumper covering above the support is backed with a buffer which is deformable under load.

15. The front end according to claim 1, wherein the supporting body component is an auxiliary frame supporting an engine.

16. A front end for a motor vehicle comprising:
    an engine compartment that is configured to house an engine;
    a supporting body component for supporting the engine;
    a bumper covering; and
    a support extending in a longitudinal direction of the motor vehicle between the bumper covering and the supporting body component, wherein the support has an original shape and is able be buckled elastically during a collision such that the support is able to return to the original shape after deformation, wherein the support comprises:
        a first lateral region that has a front edge coupled with the bumper covering;
        a second lateral region that has a rear edge that is secured to the supporting body component; and a central region located between the first lateral region and the second lateral region, wherein the central region has an upwardly oriented concavity with respect to the first lateral region and the second lateral region such that the support has a curvature in an unstressed state to ensure that the central region buckles in a downward direction when stressed.

17. A front end for a motor vehicle comprising:
an engine compartment that is configured to house an engine;
a supporting body component for supporting the engine;
a bumper covering; and
a support extending in a longitudinal direction of the motor vehicle between the bumper covering and the supporting body component, wherein the support has an original shape and is able to be buckled elastically during a collision such that the support is able to return to the original shape after deformation, wherein the support comprises:
   a first lateral region that has a front edge coupled with the bumper covering;
   a second lateral region that has a rear edge that is secured to the supporting body component; and
   a central region located between the first lateral region and the second lateral region, wherein the support is produced from a plastic which is reinforced with fibers, and wherein the fibers are aligned at least predominantly in the longitudinal direction of the vehicle.

18. The front end according to claim 1, wherein the engine compartment is configured to house a radiator, and wherein the central region extends below the radiator.

* * * * *